United States Patent
Tiirola et al.

(10) Patent No.: US 9,722,766 B2
(45) Date of Patent: Aug. 1, 2017

(54) REFERENCE CONFIGURATION FOR FLEXIBLE TIME DIVISION DUPLEXING

(71) Applicant: Nokia Solutions and Networks Oy, Espoo (FI)

(72) Inventors: Esa Tapani Tiirola, Kempele (FI); Kari Juhani Hooli, Oulu (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 16 days.

(21) Appl. No.: 14/782,906

(22) PCT Filed: Apr. 8, 2013

(86) PCT No.: PCT/EP2013/057296
§ 371 (c)(1),
(2) Date: Oct. 7, 2015

(87) PCT Pub. No.: WO2014/166515
PCT Pub. Date: Oct. 16, 2014

(65) Prior Publication Data
US 2016/0056947 A1  Feb. 25, 2016

(51) Int. Cl.
*H04W 24/00* (2009.01)
*H04W 72/04* (2009.01)
(Continued)

(52) U.S. Cl.
CPC ............ *H04L 5/22* (2013.01); *H04B 7/0456* (2013.01); *H04L 5/003* (2013.01); *H04L 5/0042* (2013.01)

(58) Field of Classification Search
CPC ... H04W 24/00; H04W 24/72; H04W 24/042; H04W 80/04; H04W 84/042; H04W 72/04
See application file for complete search history.

(56) References Cited

U.S. PATENT DOCUMENTS

2011/0305211 A1*  12/2011  Lunttila ............... H04L 5/0092
  370/329
2013/0343217 A1*  12/2013  Pan .................... H04W 72/082
  370/252
(Continued)

FOREIGN PATENT DOCUMENTS

EP     2 498 419 A2    9/2012
WO   WO 2010/049587 A1   5/2010
(Continued)

OTHER PUBLICATIONS

Nokia Siemens Networks et al: "Reference Configuration Method for Dynamic UL-DL Reconfiguration" 3GPP Draft; R1-131225, 3rd Generation Partnership Project (3GPP), Mobile Competence Centre; 650, Route Des Lucioles; F-06921 Sophia-Antipolis Cedex; France vol. RAN WG1, No. Chicago, US 20130415-20130419 Apr. 6, 2013, XP050697131, http://www.3gpp.org/ftp/tsg_ran/WG1_RL1/TSGR1_72b/Docs/[retrieved on Apr. 6, 2013].
(Continued)

*Primary Examiner* — Andrew Lee
(74) *Attorney, Agent, or Firm* — Harrington & Smith (57) ABSTRACT

There are provided measures for reference configuration for flexible time division duplexing. Such measures exemplarily include obtaining a first configuration parameter and a second configuration parameter, determining an uplink reference configuration for a flexible uplink/downlink mode from said first configuration parameter, determining a downlink reference configuration for said flexible uplink/downlink mode from said second configuration parameter, and deriving an uplink/downlink configuration candidate set based on at least one of said first configuration parameter and said second configuration parameter.

23 Claims, 5 Drawing Sheets

(51) Int. Cl.
*H04L 5/22* (2006.01)
*H04L 5/00* (2006.01)
*H04B 7/0456* (2017.01)

(56) References Cited

U.S. PATENT DOCUMENTS

| | | | |
|---|---|---|---|
| 2014/0086112 A1* | 3/2014 | Stern-Berkowitz | H04W 72/1289 370/280 |
| 2014/0204961 A1 | 7/2014 | Hooli et al. | 370/476 |
| 2014/0274011 A1* | 9/2014 | Jain | H04W 8/22 455/418 |
| 2014/0341151 A1* | 11/2014 | Yang | H04L 1/1861 370/329 |
| 2015/0117272 A1* | 4/2015 | Gao | H04L 1/1861 370/280 |
| 2015/0200761 A1* | 7/2015 | Kim | H04L 1/1867 370/280 |
| 2015/0373550 A1* | 12/2015 | Hong | H04W 72/0446 370/254 |
| 2016/0007323 A1* | 1/2016 | Suzuki | H04L 5/0053 370/329 |
| 2016/0165545 A1* | 6/2016 | Ouchi | H04W 52/146 455/522 |
| 2016/0183308 A1* | 6/2016 | Eriksson | H04L 1/1812 370/329 |
| 2016/0286435 A1* | 9/2016 | Zhang | H04W 28/18 |

FOREIGN PATENT DOCUMENTS

| | | |
|---|---|---|
| WO | WO 2012/113131 A1 | 8/2012 |
| WO | WO 2013/023683 A1 | 2/2013 |

OTHER PUBLICATIONS

3GPP TSG RAN WG1 Meeting #72, St. Julian's, Malta, Jan. 28-Feb. 1, 2013, R1-130130, "HARQ timing in TDD-eIMTA", ZTE, 3 pgs.

3GPP TSG RAN WG1 Meeting #72, St. Julian's, Malta, Jan. 28-Feb. 1, 2013, R1-130421, "Discussion on backward compatibility for TDD UL-DL reconfiguration", Renesas Mobile Europe Ltd., 3 pgs.

3GPP TSG-RAN Meeting #58, Barcelona, Spain, Dec. 4-7, 2012, RP-121772, "New work item proposal for Further Enhancements to LTE TDD for DL-UL Interference Management and Traffic Adaptation", CATT, 18 pgs.

* cited by examiner

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

REFERENCE CONFIGURATION FOR FLEXIBLE TIME DIVISION DUPLEXING

FIELD

The present invention relates to reference configuration arrangement for flexible time division duplexing. More specifically, the present invention exemplarily relates to measures (including methods, apparatuses and computer program products) for realizing reference configuration for flexible time division duplexing.

BACKGROUND

The present specification generally relates to relates to Long Term Evolution Advanced (LTE-Advanced, LTE-A) system which will be part of 3$^{rd}$ Generation Partnership Project (3GPP) LTE Rel-12. More specifically, the present specification focuses on signalling arrangement related to flexible downlink (DL)-uplink (UL) traffic adaptation in TD-LTE.

Time division (TDD) LTE (TD-LTE) Rel-11 supports UL-DL reconfiguration only with periodicity of 640 ms or longer. The goal of Rel-12 is to enable faster time division duplexing (TDD) UL-DL reconfiguration. The question is how to provide the necessary signaling mechanism(s) such as hybrid automatic retransmission request (HARQ)/scheduling timeline for user equipments (UE) supporting flexible UL/DL mode.

According to 3GPP document R1-130421, the candidate set for TDD UL-DL configuration is defined in the following way. Namely, only a UL subframe or a special subframe which is followed by an actual DL subframe can be changed to a DL subframe, while it is not allowed to change a DL subframe to a UL subframe or special subframe. Further, no new TDD UL-DL configuration is introduced, and TDD reconfiguration can only happen among existing seven configurations. In addition, candidate TDD UL-DL configuration is defined for each of existing seven TDD UL-DL configurations as shown in the table below, illustrating a definition for candidate TDD UL-DL configuration.

| SIB1 Indicated TDD UL-DL Configuration | Candidate TDD UL-DL configuration set |
|---|---|
| 0 | 0, 1, 2, 3, 4, 5, 6 |
| 1 | 2, 3, 4, 5 |
| 2 | 3, 4, 5 |
| 3 | 4, 5 |
| 4 | 5 |
| 5 | NA |
| 6 | 1, 2, 3, 4, 5 |

The biggest advantage of such approach may be that legacy UE's channel state information (CSI) measurement is kept unchanged since DL frame is not used as UL subframe. The disadvantage of this approach may be that it does not consider potential limitations caused by the signaling solutions at all.

Figure 4:
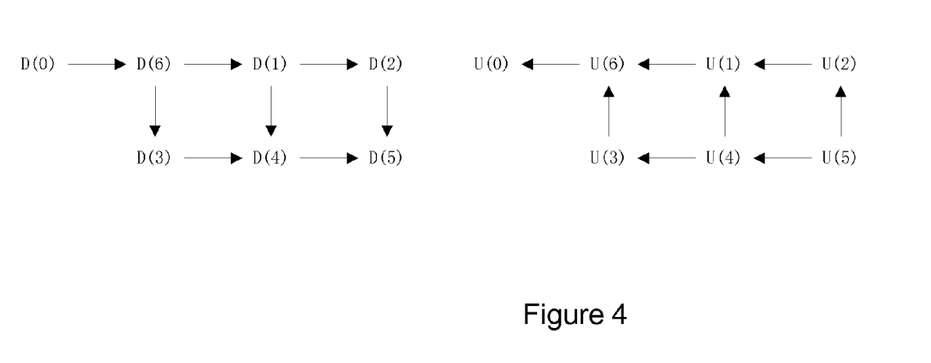
FIG. 4 shows a schematic diagram of subset relations for UL and DL subframes.

Document 2010E02547 FI ("HARQ design for dynamic UL/DL allocation in backwards compatible LTE-TDD") introduces a reference configuration method. More detailed illustration of such reference configuration method can be found in 3GGP document R1-130130. FIG. 4 (as adopted from 3GPP document R1-130130) shows a schematic diagram of subset relations for UL and DL subframes, in particular the subset relation for DL and UL reference configurations as a function of UL-DL configuration. For example, a relation D(1)→D(2) means that DL subframes in configuration #1 form a subset of DL subframes in configuration #2. Accordingly, for example, the relation U(2)→U(1) means that UL subframes in configuration #2 form a subset of UL subframes in configuration #1.

According to 3GGP document R1-130130 it is possible to vary UL-DL configuration, m, to the UE as long as long as D(A)→D(m)→D(B) or equivalently U(B)→U(m)→U(A).

It is noted that 3GPP document R1-130130 provides just a high level principle for defining the properties of UL-DL reference configurations. It does not provide a working solution for dynamic UL-DL configuration adjustment in TD-LTE cell having legacy UEs in the system.

The main problem is identified as what is a complete solution for a reference configuration based method supporting scenario having both legacy UEs as well as flexible UL/DL mode UEs operating simultaneously in the same TD-LTE cell.

Hence, the problem arises how to define the possible UL-DL configurations that can be applied with each of the different (seven) UL-DL configurations defined by the system information block number 1 (SIB-1) (which is followed by the legacy UEs). Further, the problem arises how to define UL/DL reference configurations with an UL-DL configuration defined by SIB-1. In addition, the problem arises what signaling mechanisms are needed.

Hence, there is a need to provide for reference configuration for flexible time division duplexing.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising obtaining a first configuration parameter and a second configuration parameter, determining an uplink reference configuration for a flexible uplink/downlink mode from said first configuration parameter, determining a downlink reference configuration for said flexible uplink/downlink mode from said second configuration parameter, and deriving an uplink/downlink configuration candidate set based on at least one of said first configuration parameter and said second configuration parameter.

According to an exemplary aspect of the present invention, there is provided an apparatus comprising obtaining means configured to obtain a first configuration parameter and a second configuration parameter, determining means configured to determine an uplink reference configuration for a flexible uplink/downlink mode from said first configuration parameter, and to determine a downlink reference configuration for said flexible uplink/downlink mode from said second configuration parameter, and deriving means configured to derive an uplink/downlink configuration candidate set based on at least one of said first configuration parameter and said second configuration parameter.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables to solve at least part of the problems and drawbacks identified in relation to the prior art.

By way of exemplary embodiments of the present invention, there is provided reference configuration for flexible time division duplexing. More specifically, by way of exemplary embodiments of the present invention, there are provided measures and mechanisms for realizing reference configuration for flexible time division duplexing.

Thus, improvement is achieved by methods, apparatuses and computer program products enabling/realizing reference configuration for flexible time division duplexing.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) reference configuration for flexible time division duplexing.

According to a 3GPP LTE Rel-12 Work Item "Further Enhancements to LTE TDD for DL-UL Interference Management and Traffic Adaptation", following relevant objectives related to the present invention are found.

The objective of this work item (related to the present invention) is to enable TDD UL-DL reconfiguration for traffic adaptation in small cells, including:

agree on the supported time scale together with the necessary signaling mechanism(s) for TDD UL-DL reconfiguration and specify the necessary (if any) enhancements for TDD UL-DL reconfiguration with the agreed time scale and signaling mechanism(s), e.g. HARQ/scheduling timeline, RLM/RRM measurements, CSI reporting, backward compatibility shall be maintained and performance (both RRC_CONNECTED and RRC_IDLE) of both legacy UEs and UEs supporting operation in cells with TDD UL-DL reconfiguration based on traffic adaptation shall be considered for the scope of this work item.

Generally speaking, signalling mechanisms for TDD UL-DL reconfiguration form a crucial part of the mentioned work item. So called reference configuration method is considered as the preferred way to arrange HARQ and scheduling timing for flexible TDD. This scheme can be realized by applying HARQ and scheduling timing based on different (but existing) TDD configurations (=reference configurations) for uplink and downlink.

The main advantage of the reference configuration method is that it is a relatively simple solution, which completely avoids the potential misunderstanding between evolved NodeB (eNB) and UE regarding to HARQ timing when TDD allocation changes. Furthermore, it supports all different time scales and signalling schemes (implicit/explicit) used for conveying the actual UL/DL reconfiguration signaling.

It is noted that the principle of the reference configuration method is already supported by the UEs supporting carrier aggregation with different UL-DL configurations.

Figure 3:
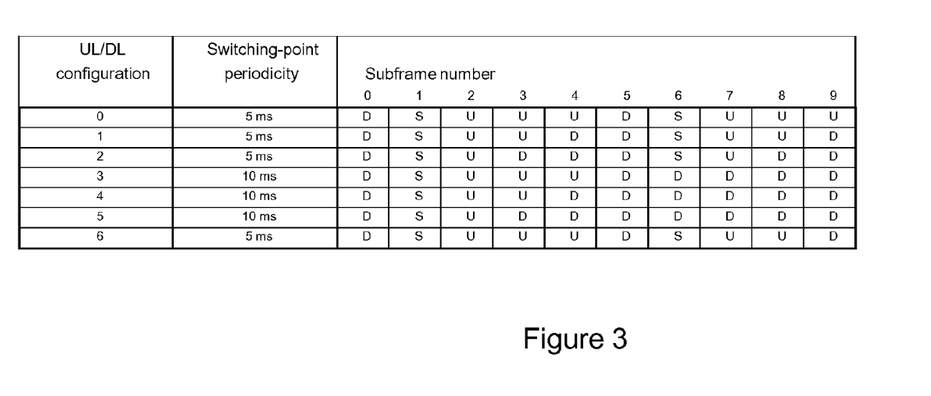
FIG. 3 shows a schematic diagram of UL/DL configurations for TD-LTE Rel-8/9/10/11.

Backwards compatibility has been explicitly mentioned in the respective work item. In typical case, there are legacy UEs in the cell and they don't support flexible UL-DL reconfiguration. Instead, they follow one out of seven available UL-DL configurations defined by the SIB-1. The available UL-DL configurations are depicted in FIG. 3, showing a schematic diagram of UL/DL configurations for TD-LTE Rel-8/9/10/11. In FIG. 3 the distribution of different subframe types (U=UL subframe, D=DL subframe, S=special subframe, F=flexible subframe) according to the possible UL/DL configurations is shown.

According to exemplary embodiments of the present invention there is provided a complete solution for reference configuration based method supporting scenario having both legacy UEs as well as flexible UL/DL mode UEs operating simultaneously in the same TD-LTE cell.

Among others, following conditions are to be fulfilled by the preferred solution. Namely, flexible UL/DL mode should have no impact for the channel state information (CSI) measurement of the legacy UEs. Further, flexible UL/DL mode should provide maximal flexibility in terms of number of supported UL-DL configurations, that is, flexible UL/DL mode should not be limited to e.g. configurations with 5 ms periodicity only, but may for example also include configurations with 10 ms periodicity. In addition, no ambiguity on related to the A/N codebook size is asked.

According to exemplary embodiments of the present invention there is provided a complete solution for flexible DL-UL traffic adaptation based on the reference configuration method. A scenario with both legacy UEs as well as flexible UL/DL mode UEs operating simultaneously in the TD-LTE cell is considered.

Figure 5:
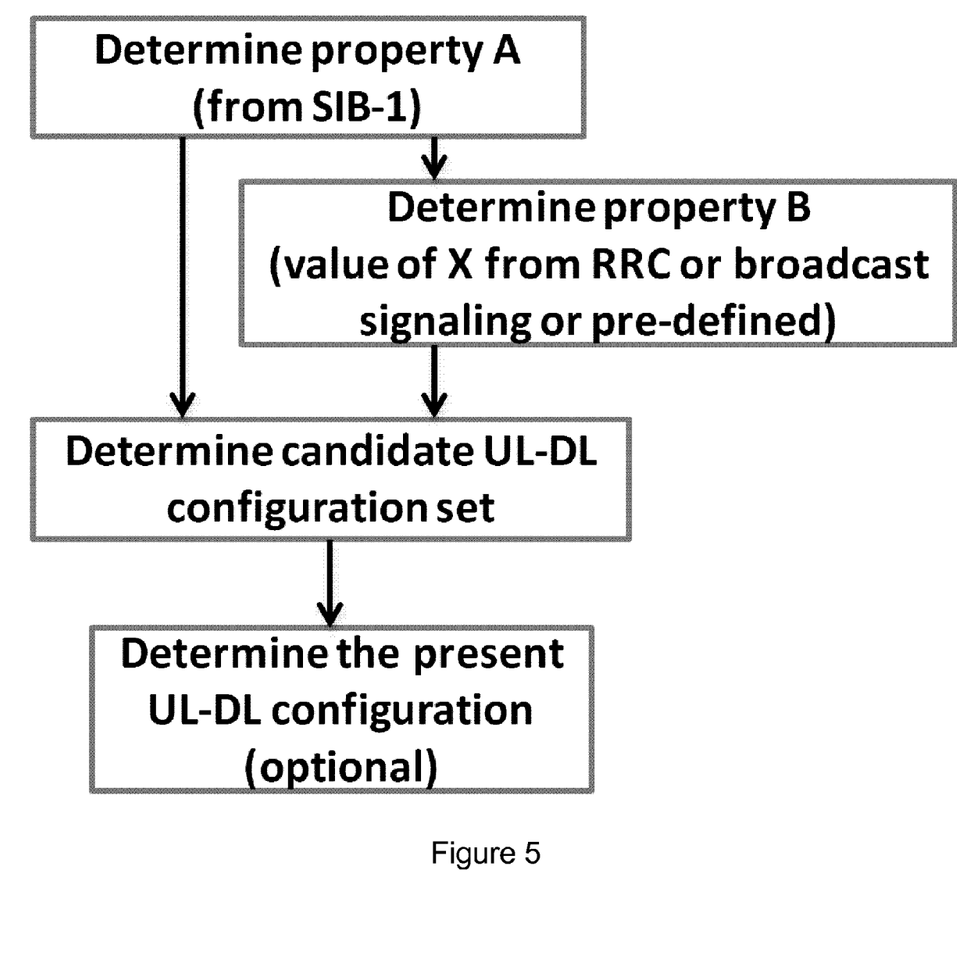
FIG. 5 is a schematic diagram alternatively illustrating a procedure according to exemplary embodiments of the present invention.

The proposed solution according to exemplary embodiments of the present invention, which is available for UEs configured for flexible UL/DL mode, is achieved by means of determining UL and DL reference configurations (called as property A and property B) as well as the candidate set of UL-DL configurations (called as property C) as a function of UL-DL configuration defined by the SIB-1. To be more accurate, it is proposed to determine properties A, B and C using two configuration parameters, which are called in the following as "configuration X", and "SIB-1 configuration". The related UE procedure is depicted in FIG. 5, alternatively illustrating a procedure according to exemplary embodiments of the present invention.

The detailed scheme according to exemplary embodiments of the present invention is characterized as follows.

At first, SIB-1 configuration defines the UL reference configuration (property A) for UEs configured to flexible UL/DL mode. In this regard it is noted that the UL reference configuration defines at least one of a physical uplink shared channel to physical hybrid automatic repeat request indicator channel (PUSCH-to-PHICH) timing and a downlink control information/physical hybrid automatic repeat request indicator channel to physical uplink shared channel (DCI/PHICH-to-PUSCH) timing. It may also define the number of hybrid automatic repeat request (HARQ) processes available in UL side. It should be noted that term PHICH covers any HARQ-ACK channels available, including also EPHICH (Enhanced PHICH) which may be a future evolution of PHICH. The same applies to DCI which may cover e.g. both PDCCH and EPDCCH.

Further, the second UL-DL configuration (denoted as X) defines the DL reference configuration (property B) for UEs configured to flexible UL/DL mode. In this regard it is noted that the DL reference configuration defines physical downlink shared channel to acknowledgement (PDSCH-to-ACK) timing. It may also define the maximum number of HARQ processes available in DL side as well as a size of the hybrid automatic repeat request acknowledgement (HARQ-ACK) codebook.

The value X is selected from set of existing configurations (Including also possible future extensions made for UL/DL configurations).

The value X is selected in a way that that the following condition is fulfilled. D(SIB-1)→D(X), which means that DL subframes corresponding to UL-DL configuration defined by the SIB-1 form a subset of DL subframes defined by X.

Further, the value X defines the candidate set of UL-DL configurations (property C) available for UEs configured to flexible UL/DL mode.

According to exemplary embodiments of the present invention, the UE may utilize this information to derive the subframe type (UL subframe, DL subframe, special subframe, flexible subframe) for at least one subframe of the radio frame.

According to further exemplary embodiments of the present invention, X is selected and predefined (i.e. set to a fixed value) such that the size of UL-DL candidate set is maximized. Setting X=5 does so. The table below shows the candidate set as a function of SIB-1 configurations (assuming X=5). This choice (X=5) may minimize the related RRC signaling. Furthermore, it could enable the change of the candidate set on the fly, based on re-configured UL-DL configuration defined by SIB-1.

| SIB-1 Indicated TDD UL-DL Configuration | Candidate TDD UL-DL configuration set |
|---|---|
| 0 | 0, 1, 2, 3, 4, 5, 6 |
| 1 | 1, 2, 4, 5 |
| 2 | 2, 5 |
| 3 | 3, 4, 5 |
| 4 | 4, 5 |
| 5 | 5 |
| 6 | 1, 2, 3, 4, 5, 6 |

According to still further embodiments of the present invention, X can be configured to the UE. Following this approach, the size of candidate set is varied according to the value of X in predefined manner. An example of such is shown in the table below, assuming that UL-DL configuration defined by SIB-1 equals to 0.

| X | Candidate TDD UL-DL configuration set |
|---|---|
| 0 | 0 |
| 1 | 0, 1, 6 |
| 2 | 0, 1, 2, 6 |
| 3 | 0, 3, 6 |
| 4 | 0, 1, 3, 4, 6 |
| 5 | 0, 1, 2, 3, 4, 5, 6 |
| 6 | 0, 6 |

Figure 1:
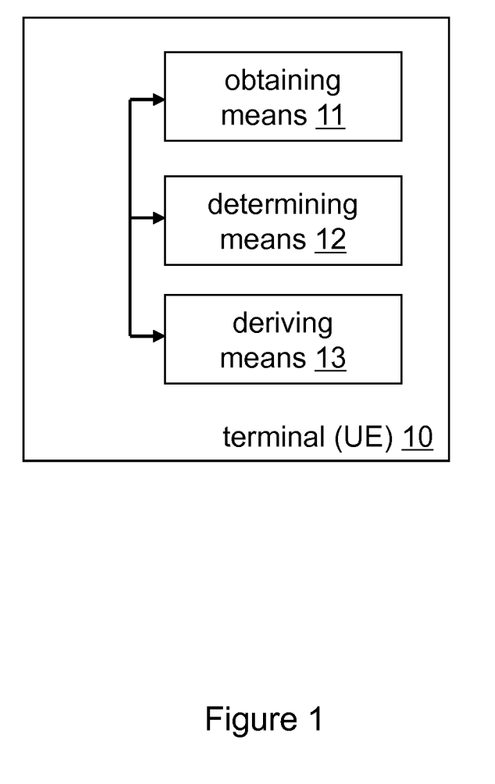
FIG. 1 is a block diagram illustrating an apparatus according to exemplary embodiments of the present invention.
Figure 2:
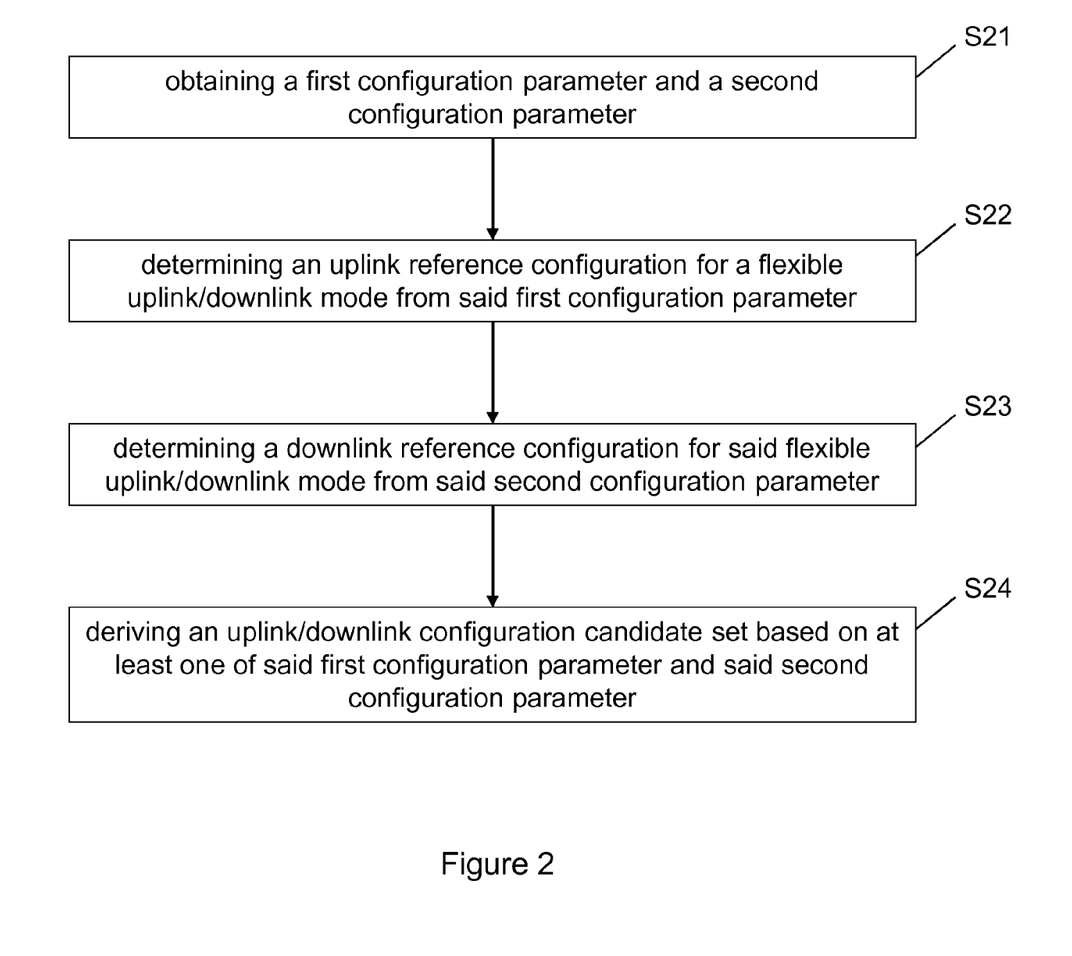
FIG. 2 is a schematic diagram of a procedure according to exemplary embodiments of the present invention.

FIG. 1 is a block diagram illustrating an apparatus according to exemplary embodiments of the present invention. The apparatus may be a terminal such as a user equipment 10 comprising a obtaining means 11, a determining means 12 and a deriving means 13. FIG. 2 is a schematic diagram of a procedure according to exemplary embodiments of the present invention. The apparatus according to FIG. 1 may perform the method of FIG. 2 but is not limited to this method. The method of FIG. 2 may be performed by the apparatus of FIG. 1 but is not limited to being performed by this apparatus.

As shown in FIG. 2, a procedure according to exemplary embodiments of the present invention comprises an operation of obtaining a first configuration parameter and a second configuration parameter (S21), an operation of determining an uplink reference configuration for a flexible uplink/ downlink mode from said first configuration parameter (S22), an operation of determining a downlink reference configuration for said flexible uplink/downlink mode from said second configuration parameter (S23), and an operation of deriving an uplink/downlink configuration candidate set based on at least one of said first configuration parameter and said second configuration parameter (S24). It is noted that the procedure shown in FIG. 2 may be varied in that the steps mentioned above (i.e. steps S21 to S24) are not fixed to the order as mentioned above. As a non-limiting example, steps S22 and S23 may be interchanged in order.

According to a variation of the procedure shown in FIG. 2, exemplary additional operations are given, which are inherently independent from each other as such. According to such variation, an exemplary method according to exemplary embodiments of the present invention may comprise an operation of obtaining an actual uplink/downlink configuration from said uplink/downlink configuration candidate set based on received configuration signaling conveying the actual UL/DL reconfiguration signaling.

According to yet another variation, an exemplary method according to exemplary embodiments of the present invention may comprise an operation of downlink control channel detection on such subframes that are defined to be downlink subframes in at least one of the uplink/downlink configurations contained in the said uplink/downlink configuration candidate set. Operation of downlink control channel detection may comprise blind decoding of a downlink control channel, such as physical downlink control channel or enhanced physical downlink control channel. In other words, UE determines a set of subframes based on the uplink/downlink configuration candidate set so that the set of subframes contains all subframes that are defined to be downlink subframes in at least one of the uplink/downlink configurations contained in the said uplink/downlink configuration candidate set. After that, UE blind decodes downlink control channel on the said set of subframes, in order to receive a possible resource allocation grant directed to the UE in question. Blind decoding may be restricted to a subset of downlink control channel resources.

That is, according to a variation of the procedure shown in FIG. 2, exemplary additional operations are given, which are inherently independent from each other as such. According to such variation, an exemplary method according to exemplary embodiments of the present invention may comprise an operation of determining a set of subframes corresponding to said uplink/downlink configuration candidate set, and an operation of blind decoding a downlink control channel on said set of subframes.

According to a variation of the procedure shown in FIG. 2, exemplary details of the obtaining operation (said first configuration parameter) are given, which are inherently independent from each other as such.

Such exemplary obtaining operation according to exemplary embodiments of the present invention may comprise an operation of receiving a system information block number 1, wherein said first configuration parameter is an uplink/downlink configuration parameter conveyed in said system information block number 1.

According to exemplary embodiments of the present invention, the second configuration parameter may define a first set of downlink subframes such that a second set of downlink subframes corresponding to said first configuration parameter forms a subset of said first set of subframes.

That is, the second configuration parameter (i.e. X) is selected in a way that that the following subset condition D(SIB-1)→D(X) is fulfilled, which means that DL subframes corresponding to UL-DL configuration defined by the SIB-1 form a subset of DL subframes defined by X.

According to a variation of the procedure shown in FIG. 2, exemplary details of the obtaining operation (said second configuration parameter) are given, which are inherently independent from each other as such.

Such exemplary obtaining operation according to exemplary embodiments of the present invention may comprise an operation of acquiring said second configuration parameter from a preset number. The preset number may be 5 according to further exemplary embodiments of the present invention.

According to a variation of the procedure shown in FIG. 2, exemplary details of the obtaining operation (said second configuration parameter) are given, which are inherently independent from each other as such.

Such exemplary obtaining operation according to exemplary embodiments of the present invention may comprise an operation of receiving a message including said second configuration parameter.

According to a variation of the procedure shown in FIG. 2, exemplary additional operations are given, which are inherently independent from each other as such. According to such variation, an exemplary method according to exemplary embodiments of the present invention may comprise an operation of receiving a signaling instructing an activation of said flexible uplink/downlink mode. Said signaling may include said second configuration parameter according to further exemplary embodiments of the present invention.

According to still further exemplary embodiments of the present invention said uplink reference configuration defines at least one of a physical uplink shared channel to physical hybrid automatic repeat request indicator channel timing and a downlink control information/physical hybrid automatic repeat request indicator channel to physical uplink shared channel timing and optionally a number of uplink hybrid automatic repeat request processes, and said downlink reference configuration defines a physical downlink shared channel to acknowledgement timing and optionally a maximum number of downlink hybrid automatic repeat request processes and optionally a size of a hybrid automatic repeat request acknowledgement codebook.

In other words, according to exemplary embodiments of the present invention the following signaling (sequence) is proposed:

Firstly, an initial access follows UL-DL configuration defined by SIB-1. This mode may be called as legacy UL/DL mode.

Further, an eNB may utilize dedicated higher layer signaling to configure flexible UL/DL mode for Rel-12 UEs supporting the feature.

In doing so, depending on the respective exemplary embodiment, the configuration may involve just switching the flexible UL/DL mode on or it may contain some additional configuration parameters (such as X).

Based on UL/DL configuration defined by SIB-1 and the parameter X (predefined or signaled), the UE is able to derive UL and DL reference configurations that are used when transmitting and receiving control and data signals.

Alternatively, the indication of the flexible UL/DL mode (potentially including the value of X) can be broadcasted in the cell allowing all Rel-12 UEs supporting flexible TDD to make use of it without separate configuration.

The UE may derive the candidate UL/DL configuration set based on available parameters (SIB-1 and X). The UE may utilize this information to derive the subframe type (UL subframe, DL subframe, special subframe, flexible subframe). The UE may further utilize this information also when defining the physical downlink control channel/enhanced physical downlink control channel (PDCCH/ePDCCH) blind decodings, control signaling codebook size, and possible micro sleep (to minimize UE power consumption). Furthermore, the UE may take the reference configuration into account in the CSI measurement and reporting. Additionally to the SIB-1 and X parameters, PDCCH/ePDCCH downlink control information (DCI) can contain indication (e.g. additional bit) as to whether the subframe is DL or special subframe. This information is needed when both 5 ms and 10 ms periodicity UL/DL configurations are included to the UL/DL candidate set. Furthermore, the UE may take the DL/special subframe indication into account in the CSI measurement and reporting.

Further in sequence, the UE configured to flexible UL/DL mode starts using the new configuration at the time the new configuration becomes valid (at the UE side).

The eNB may schedule only fixed subframes during the time of uncertainty. The time of uncertainty may originate due to the fact that eNB may not know in absolute terms the subframe when the new configuration is taken into use at UE side, or vice versa.

The new configuration may contain a new feedback channel for HARQ-ACK signaling conveyed via PUCCH. In the preferred embodiment, PUCCH format 3 is used to convey HARQ-ACK in flexible UL/DL mode.

The UE (defined for flexible UL/DL mode) starts using HARQ/scheduling timing and is ready to change the UL/DL configuration dynamically within the UL/DL candidate set.

Further in sequence, the eNB may reconfigure legacy UL/DL mode for the UE (at some point in time), when there is no need for flexible UL/DL mode any more.

The above mentioned exemplary embodiments of the present invention enable co-existence of legacy UEs (Rel-11 an earlier) and Rel-12 UEs supporting flexible UL/DL mode. Further, according to exemplary embodiments of the present invention, no impact for the CSI measurement of the legacy UEs is caused, since the CSI measurement of the legacy UEs can be (is) based on the SIB-1 signaled configuration. The proposed signaling solution according to exemplary embodiments of the present invention has maximal flexibility in terms of number of UL-DL configurations supported contrary to limitations of state of the art proposals to cases with 5 ms periodicity only. This enables maximization of the throughput gain of flexible UL/DL reconfiguration. Further, the impact on standards due to dynamic UL/DL configuration can be minimized according to the present proposal, and a signaling burden can be kept at reasonable level.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. terminal (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 6:
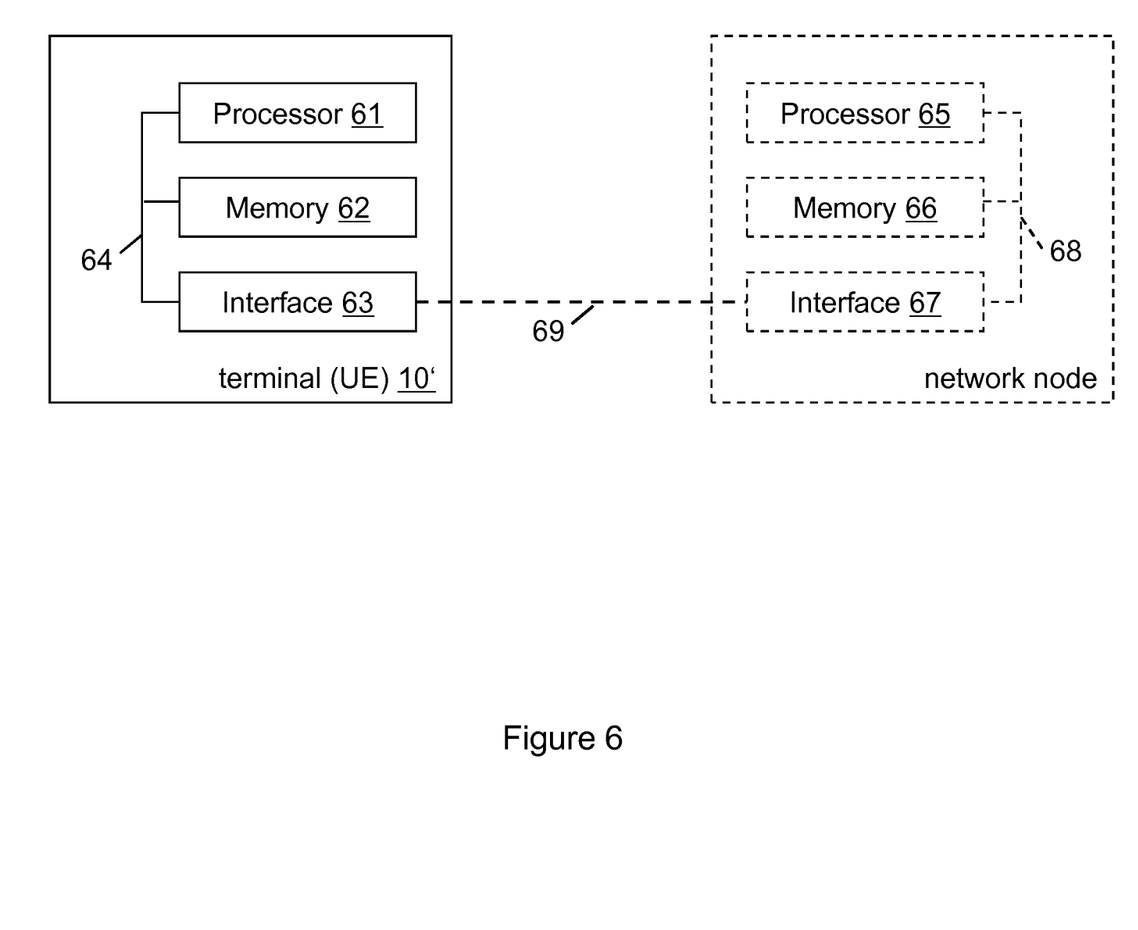
FIG. 6 is a block diagram alternatively illustrating apparatuses according to exemplary embodiments of the present invention.

In FIG. 6, an alternative illustration of apparatuses according to exemplary embodiments of the present invention is depicted. As indicated in FIG. 6, according to exemplary embodiments of the present invention, the apparatus (terminal) 10' (corresponding to the terminal 10) comprises a processor 61, a memory 62 and an interface 63, which are connected by a bus 64 or the like, and the apparatus (terminal) 10' may be connected via link 69 with a further apparatus such as a network node (e.g. eNB or the like).

The processor 61 and/or the interface 63 may also include a modem or the like to facilitate communication over a (hardwire or wireless) link, respectively. The interface 63 may include a suitable transceiver coupled to one or more antennas or communication means for (hardwire or wireless) communications with the linked or connected device(s), respectively. The interface 63 is generally configured to communicate with at least one other apparatus, i.e. the interface thereof.

The memory 62 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal comprises at least one processor 61, at least one memory 62 including computer program code, and at least one interface 63 configured for communication with at least another apparatus. The processor (i.e. the at least one processor 61, with the at least one memory 62 and the computer program code) is configured to perform obtaining a first configuration parameter and a second configuration parameter (thus the apparatus comprising corresponding means for obtaining), to perform determining an uplink reference configuration for a flexible uplink/downlink mode from said first configuration parameter (thus the apparatus comprising corresponding means for determining), to perform determining a downlink reference configuration for said flexible uplink/downlink mode from said second configuration parameter, and to perform deriving an uplink/downlink configuration candidate set based on at least one of said first configuration parameter and said second configuration parameter (thus the apparatus comprising corresponding means for deriving).

For further details regarding the operability/functionality of the individual apparatuses, reference is made to the above description in connection with any one of FIGS. 1 to 5, respectively.

For the purpose of the present invention as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for reference configuration for flexible time division duplexing. Such measures exemplarily comprise obtaining a first configuration parameter and a second configuration parameter, determining an uplink reference configuration for a flexible uplink/downlink mode from said first configuration parameter, determining a downlink reference configuration for said flexible uplink/downlink mode from said second configuration parameter, and deriving an uplink/downlink configuration candidate set based on at least one of said first configuration parameter and said second configuration parameter.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Program
A/N ACK/NACK
ACK acknowledgement
ARQ automatic repeat request
CQI channel quality indicator
CSI channel state information
DCI downlink control information
DL Downlink
eIMTA enhanced interference management and traffic adaptation
eNB evolved Node B
HARQ hybrid automatic repeat request
LTE Long Term Evolution
LTE-A Long Term Evolution Advanced
NACK negative ACK
PDCCH physical downlink control channel
PDSCH physical downlink shared channel
PHICH physical hybrid ARQ indicator channel
PUCCH physical uplink control channel PUSCH physical uplink shared channel
Rel release
RRC radio resource control
SIB-1 system information block #1 (number 1)
TDD time division duplexing
TD-LTE time division (TDD) LTE
UE user equipment
UL uplink

The invention claimed is:

1. A method comprising
obtaining a first configuration parameter and a second configuration parameter,
determining an uplink reference configuration for a flexible uplink/downlink mode from said first configuration parameter,
determining a downlink reference configuration for said flexible uplink/downlink mode from said second configuration parameter, and
deriving an uplink/downlink configuration candidate set based on at least one of said first configuration parameter and said second configuration parameter, wherein said second configuration parameter defines a first set of downlink subframes such that a second set of downlink subframes corresponding to said first configuration parameter forms a subset of said first set of subframes.

2. The method according to claim 1, further comprising
obtaining an actual uplink/downlink configuration from said uplink/downlink configuration candidate set.

3. The method according to claim 1, further comprising
determining a set of subframes corresponding to said uplink/downlink configuration candidate set, and
blind decoding a downlink control channel on said set of subframes.

4. The method according to claim 1, wherein
in relation to said obtaining said first configuration parameter, said method further comprises
receiving a system information block number 1, wherein said first configuration parameter is an uplink/downlink configuration parameter conveyed in said system information block number 1.

5. The method according to claim 1, wherein
in relation to said obtaining said second configuration parameter, said method further comprises
acquiring said second configuration parameter from a preset number.

6. The method according to claim 5, wherein said preset number is 5.

7. The method according to claim 1, wherein
in relation to said obtaining said second configuration parameter, said method further comprises
receiving a message including said second configuration parameter.

8. The method according to claim 1, further comprising
receiving a signaling instructing an activation of said flexible uplink/downlink mode.

9. The method according to claim 8, wherein said signaling includes said second configuration parameter.

10. The method according to claim 1, wherein
said uplink reference configuration defines at least one of
a physical uplink shared channel to physical hybrid automatic repeat request indicator channel timing and a downlink control information/physical hybrid automatic repeat request indicator channel to physical uplink shared channel timing and optionally a number of uplink hybrid automatic repeat request processes, and
said downlink reference configuration defines a physical downlink shared channel to acknowledgement timing and optionally a maximum number of downlink hybrid automatic repeat request processes and optionally a size of a hybrid automatic repeat request acknowledgement codebook.

11. A computer program product comprising computer-executable computer program code which, when the program is run on a computer, is configured to cause the computer to carry out the method according to claim 1.

12. The computer program product according to claim 11, wherein the computer program product comprises a computer-readable medium on which the computer-executable computer program code is stored, and/or wherein the program is directly loadable into an internal memory of the processor.

13. An apparatus comprising
obtaining means configured to obtain a first configuration parameter and a second configuration parameter,
determining means configured to determine an uplink reference configuration for a flexible uplink/downlink mode from said first configuration parameter, and to determine a downlink reference configuration for said flexible uplink/downlink mode from said second configuration parameter, and
deriving means configured to derive an uplink/downlink configuration candidate set based on at least one of said first configuration parameter and said second configuration parameter,
wherein said second configuration parameter defines a first set of downlink subframes such that a second set of downlink subframes corresponding to said first configuration parameter forms a subset of said first set of subframes.

14. The apparatus according to claim 13, wherein
said obtaining means is further configured to obtain an actual uplink/downlink configuration from said uplink/downlink configuration candidate set.

15. The apparatus according to claim 13, wherein
said determining means is further configured to determine a set of subframes corresponding to said uplink/downlink configuration candidate set, and the apparatus further comprising
blind decoding means configured to blind decode a downlink control channel on said set of subframes.

16. The apparatus according to claim 13, further comprising
receiving means configured to receive a system information block number 1, wherein said first configuration parameter is an uplink/downlink configuration parameter conveyed in said system information block number 1.

17. The apparatus according to claim 13, further comprising
acquiring means configured to acquire said second configuration parameter from a preset number.

18. The apparatus according to claim 17, wherein said preset number is 5.

19. The apparatus according to claim 13, further comprising
receiving means configured to receive a message including said second configuration parameter.

20. The apparatus according to claim 13, further comprising
receiving means configured to receive a signaling instructing an activation of said flexible uplink/downlink mode.

21. The apparatus according to claim 20, wherein said signaling includes said second configuration parameter.

22. The apparatus according to claim 13, wherein
said uplink reference configuration defines at least one of a physical uplink shared channel to physical hybrid automatic repeat request indicator channel timing and a downlink control information/physical hybrid automatic repeat request indicator channel to physical uplink shared channel timing and optionally a number of uplink hybrid automatic repeat request processes, and
said downlink reference configuration defines a physical downlink shared channel to acknowledgement timing and optionally a maximum number of downlink hybrid automatic repeat request processes and optionally a size of a hybrid automatic repeat request acknowledgement codebook.

23. The apparatus according to claim 13, wherein
the apparatus is operable as or at a terminal, user equipment, mobile station or modem, and/or
the apparatus is operable in at least one of a LTE and a LTE-A cellular system.

* * * * *